April 21, 1931. E. E. BATES 1,801,896

GAS METER

Filed Dec. 19, 1927 2 Sheets-Sheet 1

INVENTOR.
Edmond E. Bates.
BY
Geo B Rawlings
ATTORNEY.

April 21, 1931.  E. E. BATES  1,801,896

GAS METER

Filed Dec. 19, 1927  2 Sheets-Sheet 2

INVENTOR.
Edmond E. Bates
BY Ros B Rawlings
ATTORNEY

Patented Apr. 21, 1931

1,801,896

UNITED STATES PATENT OFFICE

EDMOND E. BATES, OF WINCHESTER, MASSACHUSETTS, ASSIGNOR TO AMERICAN METER CO., OF NEW YORK, N. Y., A CORPORATION OF DELAWARE

GAS METER

Application filed December 19, 1927. Serial No. 241,007.

This invention relates to gas meters, and particularly to gas meters of the positive displacement type. Such meters are known as "dry" meters and because of their greater convenience as compared with the wet meter, are commonly installed as consumer's meters.

The usual "dry" meter consists of a generally rectangular gas-tight casing provided with inlet and outlet pipes, valves, and registering mechanism. Such casing is vertically divided centrally thereof below the valve table into two diaphragm chambers of equal volume within which operates a pair of double-acting displacing pistons or diaphragms which reciprocate in their respective chambers in properly timed relation to each other whereby to insure a uniform flow of gas. As heretofore constructed, each piston comprises a pair of complemental rings and an outwardly arched bellows fold or hinge of leather flexibly connecting the rings. The diaphragm discs themselves are plane or substantially plane surfaces carried by the outer rings and carrying the flag carriages, which are operatively connected to the slide valves of the meter by suitable motion-transmitting connections. This type of meter has become standard in the trade, and in general, the object of my invention is to improve its construction and increase its capacity to the end that a more sufficient action may be had.

Heretofore, in such meters, the construction of the diaphragm and diaphragm disc and their relation to each other and to the flag carriage, has been such as to render it impossible for the diaphragm in its traversing movements to displace any of the gas in certain parts of the diaphragm chamber. This has resulted in the presence of a very considerable volume of undisplaced gas at all times in the chamber, or expressed differently, there is a very considerable gas-filled space within the chamber which is never traversed by the diaphragm.

My present invention specifically aims to utilize substantially all of this hitherto waste space for the displacement of the gas therein, that is to say, the diaphragm disc and flag carriage are so constructed and arranged that this hitherto waste or untraversed space will now be traversed by the diaphragm. In addition to allowing the displacement of gas which heretofore has remained latent or undisplaced in the meter, my invention aims to secure a greater displacement of gas with a smaller amount of leather; to secure a greater percentage by metal with a smaller percentage of displacement by leather, and to provide a novel construction of diaphragm involving a relatively straight hinge and a lesser amount of leather than heretofore.

As is well known, it is customary to oil the leather to make it flexible and gas-tight. When the oil dries out, the leather stiffens and resists the action of the diaphragm, thereby changing the "proof" of the meter. By reducing the amount of leather used and by arranging the leather as a relatively straight rather than an arched hinge, I avoid inaccurate meter action due to stiffening of the leather, and I also reduce the chances of inaccuracies, due to changes of the leather under changing conditions of use and certain properties of the gas being passed through the meter.

Other objects and advantages of my invention are to provide a diaphragm, diaphragm disc, and flag carriage which will materially reduce the wear on the diaphragm; which will allow a diaphragm disc of the largest possible size to be used in any given size of meter; which will permit the edge of such disc to be brought closer to the walls of the casing than heretofore; which will allow the placement of the flag carriage in a space heretofore unused; which will allow a greater diaphragm travel than heretofore in any given meter; which will allow a greater driving force in the meter; which will allow a straighter travel of the diaphragm in action, and in which the diaphragm motion will be practically rectilinear rather than arcual as heretofore. These, and other objects, improvements, and features of advantage, which will appear more fully hereinafter, are secured in the device of the present invention, the construction and operation of which is described and illustrated in the accompanying specification and drawings, and the characteristic features of novelty particularly pointed out in the appended claims.

In the drawings:

Fig. 1 is a front elevation of a gas meter of standard type equipped in accordance with my invention.

Figs. 2 and 3 are sections on the lines 2—2 and 3—3 respectively of Fig. 1.

Figures 1, 2:
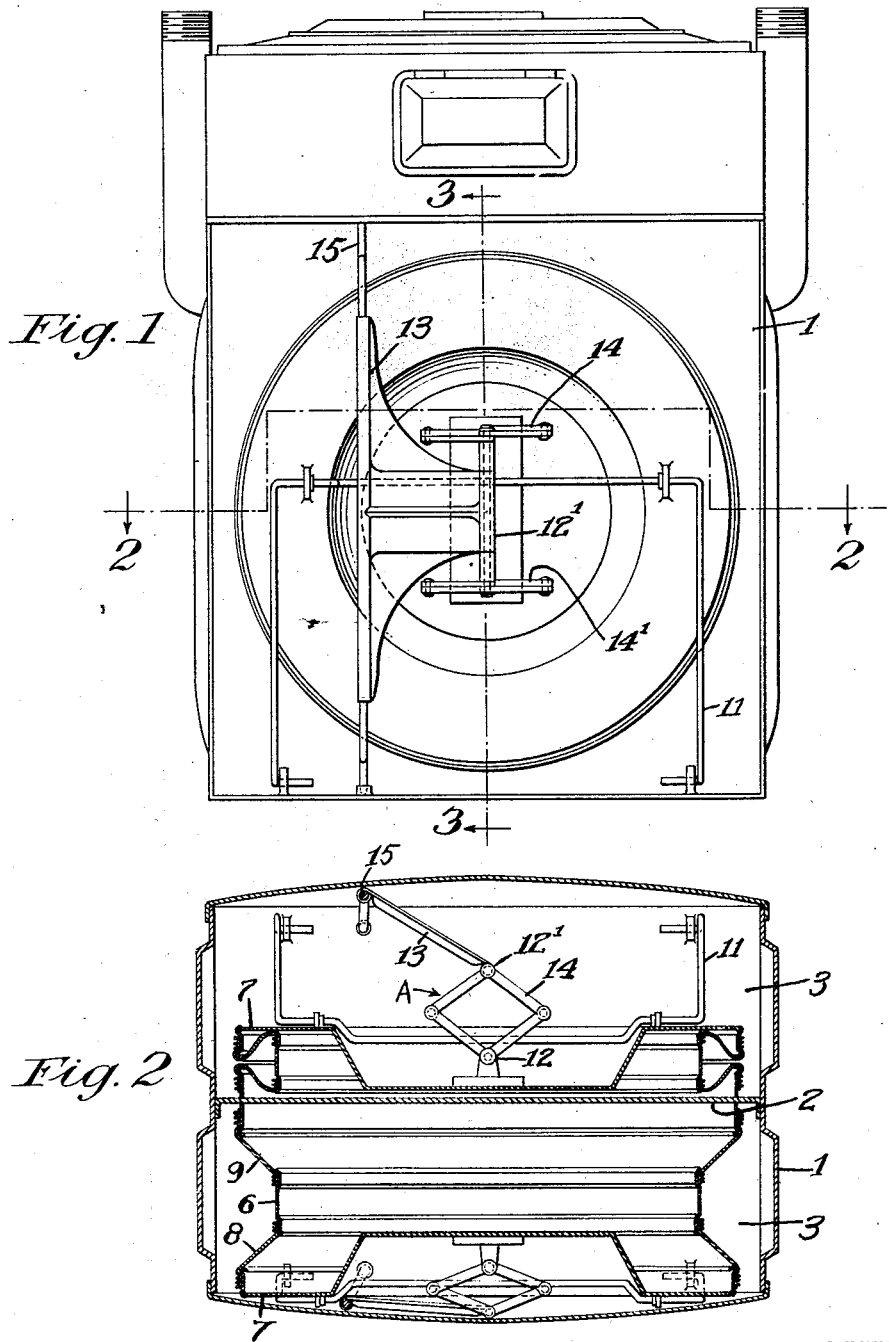

I have indicated generally at 1 the gas-tight casing of a dry meter of standard type. Such casing is substantially rectangular and is provided with the usual inlet and outlet pipes for the gas being passed through the casing and with suitable slide valve and registering mechanism.

In common with similar meters of the type indicated, the casing 1 is internally divided by a vertical partition 2 disposed centrally thereof and providing with the adjacent walls of the casing a pair of diaphragm chambers 3 of equal volume within which a pair of double-acting pistons or diaphragms of special construction reciprocate in alternation to each other.

Inasmuch as the diaphragms are duplicates, a description of one will suffice. Each diaphragm comprises a relatively stationary ring 4 and a relatively movable ring 5 spaced from but flexibly connected with the ring 4 through a third or intermediate ring 6. The rings 4 and 5 are of substantially the same diameter, and the intermediate or centre ring 6 may be either of smaller diameter than the rings 4 and 5, as in Figs. 1 to 4 inclusive, or of greater diameter than said rings, as in Fig. 5.

The relatively fixed ring 4 is mounted on the center partition 2 and the relatively movable ring 5 carries the diaphragm disc 7. Where the centre ring 6 is of smaller diameter than the outer rings 4 and 5, the flexible connection between the several rings is disposed inwardly of the rings 4 and 5, as shown in Figs. 1 to 4.

Figure 4:
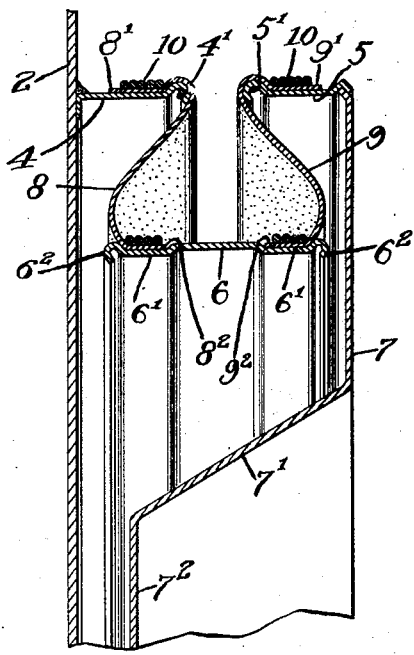
Fig. 4 is a fragmentary section particularly showing the construction of the diaphragm.

Such connection consists of a pair of oppositely disposed bellows folds or hinge bands 8 and 9 of any usual material, as leather of reentrant design and curved in reverse direction to each other, as best shown in Fig. 4, and fastened to the several discs in any suitable manner as by the usual strings 10. The spacing of the outer rings 4 and 5 is such as to leave sufficient clearance therebetween for the free action of the bellows folds 8 and 9 at all times, and the construction of the several rings 4, 5, and 6 is such as most advantageously to permit the edges of the folds 8 and 9 to be clamped thereto by the string bindings.

To this end, the rings 4 and 5 are formed as relatively flat annular bearing surfaces over which the outer edges 8' and 9' of the bellows folds are laid and clamped by the outer sets of strings 10, the opposing annular edges of such rings being formed as beads 4' and 5', respectively, to prevent dislodgment of such edges 8' and 9'.

The center ring 6 is formed to present spaced relatively shallow annular inner and outer channels 6' within which the inner edges $8^2$ and $9^2$ of the folds 8 and 9 are laid and clamped by the inner sets of strings 10, the inner and outer edges of said ring 6 being annularly beaded as at $6^2$ for a purpose similar to that of the beads 4' and 5'.

Figure 5:
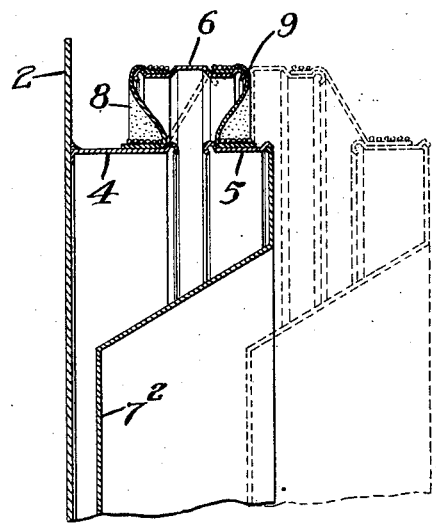
Fig. 5 is a view similar to Fig. 4 and showing an alternative diaphragm construction.

The centre ring 6 is of a width to pass freely under the outer rings 4 and 5 (Figs. 1 to 4) when the diaphragm is collapsed, or over such rings in the case of the modification shown in Fig. 5, and the outer rings 4 and 5 are of a width to allow the necessary clearance between the center ring and the center portion of the specially constructed diaphragm disc when the diaphragm is collapsed.

The bellows folds are of a proper width to allow smooth action of the several rings in the operation of the diaphragm, and such folds themselves are arranged as bands of reentrant form. The outer edges 8' and 9' of said folds are disposed in opposite direction to their inner edges $8^2$ and $9^2$ with the intermediate portion of the fold disposed as a reverse curve when the bellows is collapsed, as shown at the right in Fig. 3 and disposed at an acute angle to the planes of such edges when the bellows is extended, as shown at the left in said figure.

In addition, the folds 8 and 9 are disposed in reverse direction to each other, that is to say, the fold 8 bulges inwardly and the fold 9 bulges outwardly when the diaphragm is collapsed. (See Fig. 4.) This construction of the bellows or hinge element of the diaphragm results in several distinct advantages over prior art constructions. First, and most important, it permits the largest possible disc in any given size of meter to be used and hence permits the displacement of gas which heretofore has remained latent or undisplaced in the meter. It presents a greater area of metal and a smaller area of leather than heretofore and hence permits a greater percentage of displacement of gas by metal and a smaller percentage of displacement of gas by leather. It permits a greater displacement of gas with leather than heretofore and it practically doubles the diaphragm stroke using the same amount of hinge. And finally, it permits the leather hinge to be located within the rings in the preferred embodiment of Figs. 1 to 4 inclusive. This not only eliminates the rubbing contact of the leather against the top and bottom walls of the casing in the action of the diaphragm and consequent deterioration of the bellows, but permits the use of a diaphragm disc of larger diameter than heretofore, that is to say, the disc edge may be brought closer to the top and bottom walls of the casing.

The diaphragm disc 7 is itself of special design so as to allow the displacement of gas heretofore latent or undisplaced in the meter; to allow the flag carriage to be placed in a space heretofore unused in the meter, to allow a greater diaphragm travel than heretofore, to give a greater driving force in the meter, and to allow a straighter travel of the diaphragm than heretofore.

Figure 3:
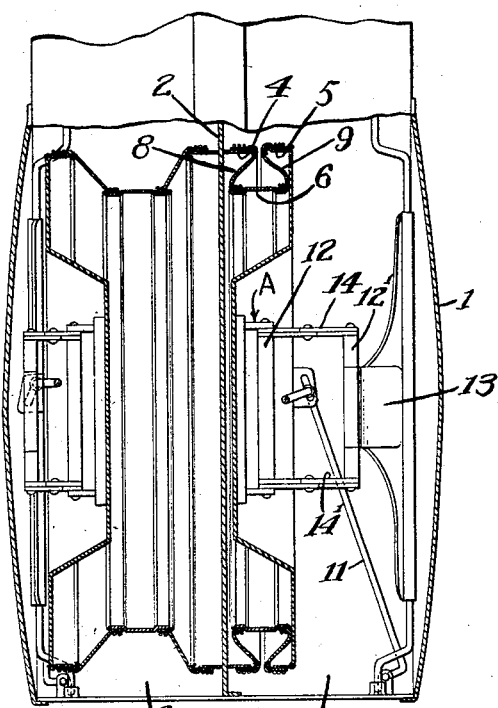

To these ends, the disc is inwardly dished towards its center, as best shown in Figs. 3 and 4, presenting at its periphery a plane surface which extends from its point of attachment with the ring 5 to a point beneath the center ring 6, thence is bent sharply downwardly and inwardly as indicated at 7', for a slight distance, and thence extends as a plane surface 7² disposed relatively inwardly towards the center partition 2 and in offset generally parallel relation to the peripheral portion of the disc.

The disc is guided by the usual guide wire 11 as heretofore but the inwardly dished form of disc reduces to the minimum the amount of untraversed space between the partition 2 and diaphragm disc as clearly appears in Fig. 3, and also permits the flag carriage A to be located relatively considerably closer to the partition 2 than has heretofore been possible, or in other words, to be mounted in a space heretofore unused for such purpose and allowing the space heretofore occupied by the flag carriage to be used for diaphragm travel. Moreover, when used with such an inwardly disposed bellows or hinge as shown in Figs. 1 to 4 inclusive, the edge of the disc may be brought closer to the top and bottom walls of the casing than heretofore, or in other words, a large diameter disc may be used than heretofore in the same size of meter. Primarily, however, such a disc and hinge increases the capacity of the meter by permitting the displacement of gas which heretofore has been latent or undisplaced. My disc fills practically the entire diaphragm compartment, whereas heretofore, a definite clearance space had to be left for the diaphragm leather.

The flag carriages A are mounted on the inwardly inset portions 7² of the discs and so mounted lie within the planes of the discs themselves instead of projecting outwardly beyond the discs as heretofore. Such carriages hence allow a greater diaphragm travel, and a travel which is straighter than heretofore, as well as reducing the diaphragm motion to the proper flag motion.

I show several embodiments capable of accomplishing these last-named results. In each the linkages between the discs and flags 13 is such as materially to reduce the arcual motion of the disc so that the disc has more nearly a rectilinear motion. As shown in Figs. 1 to 3 inclusive, such linkage comprises two sets of lazy tongs 14 and 14' connecting the inner and outer rock shafts 12 and 12' respectively of the flag carriage, each set including four links, one link of each set (indicated as the links 14 and 14' in Figs. 1, 2, and 3) being rigidly fastened to the outer rock shaft 12', all other links being pivoted, so that the motion of the diaphragm disc can be cut down to the motion desired for the flag. The flag 13 is rigidly fastened at its inner ends to the rock shaft 12' and at its outer end to the usual vertically disposed flag rod 15 and above the usual valve table of the meter connects through usual mechanism (not shown) with the slide valves of the meter.

Figure 6:
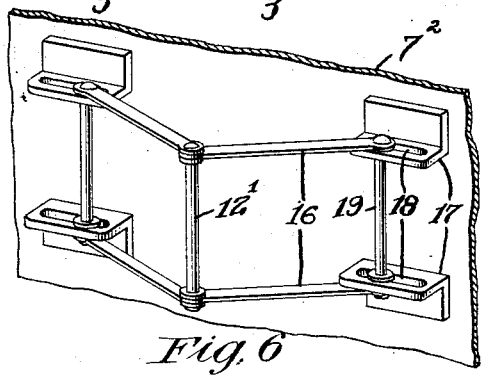
Figs. 6 and 7 are fragmentary details showing modifications of the flag carriage illustrated in Figs. 1 to 3 inclusive.

In Fig. 6 I show a modification designed to accomplish the same results as the form shown in Figs. 1 to 4 inclusive. Referring to this figure, the outer rock shaft 12' of the flag carriage is connected to the disc 7 by oppositely extending pairs of parallel links 16. The disc itself carries two pairs of alined bearings 17 which are longitudinally slotted as at 18 to receive cross bolts 19 connecting the outer ends of the link sets.

Figure 7:
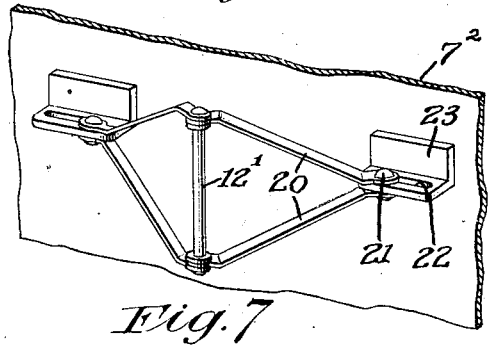

In the variant shown in Fig. 7 the links 20 are connected at their inner ends to the ends of the outer rock shaft 12' of the flag carriage, but instead of being parallel to each other as in Fig. 6, said links are bent towards each other and at their outer ends are joined by relatively short bolts 21 which are slidably received in the longitudinal slots 22 of but a single pair of alined bearings 23 mounted on the disc 7. In all three forms, the effect is both to permit the motion of the disc to be reduced to the motion desired for the flag and to allow the disc to travel in a substantially rectilinear direction as distinguished from an arcual motion.

In each of the embodiments of the invention the flag carriage consists of the parts connecting the flag with the diaphragm disk.

While I have shown and described my invention as applied to a consumer's meter, it will be understood that this treatment is illustrative rather than limiting and that the principles of my invention are capable of adaptation to other meters. Similarly, while I have shown a preferred form of diaphragm disc, I recognize that various other shapes might be employed and still obtain the improved results obtained by the particular form shown herein. In fact, my invention is capable of many variations, both as to use and structure, without departure from the principles involved, and accordingly I regard as within the purview of my invention all such modifications and variants as fall within the spirit and scope of my invention as defined by the appended claims.

What I therefore claim and desire to secure by Letters Patent is:

1. In a gas meter having an outer wall and a vertical partition defining a gas chamber, a diaphragm inclusive of a diaphragm disc in said chamber, a flag and a flag carriage including a collapsible linkage pivotally connecting the disc to the flag and adapted to collapse as the diaphragm opens to allow the disc full travel in said chamber.

2. In a gas meter having an outer wall and a vertical partition defining a gas chamber, a diaphragm in said chamber inclusive of a diaphragm disc, a collapsible flag carriage connected to the said disc and including links and inner and outer rock shafts connected by said links, and a flag connected with said flag carriage.

3. In a gas meter having an outer wall and a vertical partition defining a gas chamber, a diaphragm in said chamber inclusive of a diaphragm disc having an inwardly dished portion, a flag carriage comprising a collapsible linkage mounted on the inwardly dished portion of said disc, and a flag directly connected with said linkage.

4. In a gas meter having an outer wall and a vertical partition defining a gas chamber, a diaphragm including a pair of spaced rings, an intermediate ring, flexible hinge bands connecting the intermediate ring with the pair of rings, said intermediate ring being of different diameter from the rings of the ring pair to cause the hinge to flex alternately in opposite directions as the diaphragm opens and closes, and a diaphragm disc carried by one of said pair of rings, a flag, and a collapsible flag carriage connecting the disc to the flag and collapsing as the diaphragm opens.

5. In a gas meter, a diaphragm inclusive of a disc having an inwardly dished portion, a flag, and a collapsible flag carriage connecting the dished portion of said disc with said flag and adapted to be collapsed at least in part within the dished portion of said disc when the diaphragm is opened.

6. In a gas meter, a diaphragm disc, a collapsible flag carriage carried entirely by said disc, and a flag connected with said flag carriage solely for pivotal movement with respect to said flag carriage.

7. In a gas meter, a diaphragm disc, a flag carriage mounted in its entirety on said disc, and a flag connected with said flag carriage, said flag carriage being collapsible whereby the point of connection of the flag therewith is movable towards and from the disc.

In testimony whereof I affix my signature.

EDMOND E. BATES.